US009518508B2

(12) United States Patent
Wolfgang et al.

(10) Patent No.: US 9,518,508 B2
(45) Date of Patent: Dec. 13, 2016

(54) CONTROL DEVICE OF A HYBRID VEHICLE AND METHOD FOR OPERATING SAME

(71) Applicant: ZF Friedrichshafen AG, Friedrichshafen (DE)

(72) Inventors: Werner Wolfgang, Ravensburg (DE); Thea Schlueter, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/361,309

(22) PCT Filed: Nov. 5, 2012

(86) PCT No.: PCT/EP2012/071784
§ 371 (c)(1),
(2) Date: May 29, 2014

(87) PCT Pub. No.: WO2013/083336
PCT Pub. Date: Jun. 13, 2013

(65) Prior Publication Data
US 2014/0311427 A1    Oct. 23, 2014

(30) Foreign Application Priority Data

Dec. 8, 2011   (DE) .................. 10 2011 087 943

(51) Int. Cl.
F02B 63/00    (2006.01)
F02B 63/04    (2006.01)
(Continued)

(52) U.S. Cl.
CPC ............ *F02B 63/04* (2013.01); *B60K 6/48* (2013.01); *B60W 10/02* (2013.01); *B60W 10/06* (2013.01);
(Continued)

(58) Field of Classification Search
CPC ... F02B 63/04; F02B 2063/045; F02B 63/044; F02B 77/13; F02B 75/16
(Continued)

(56) References Cited

U.S. PATENT DOCUMENTS 6,887,180 B2    5/2005  Pels et al.
2006/0207562 A1*  9/2006  Miyazaki ............. F02D 35/027
                                                    123/431

(Continued)

FOREIGN PATENT DOCUMENTS

DE        102 09 514 A1   10/2002
DE    10 2007 099 527 A1    9/2007
(Continued)

OTHER PUBLICATIONS

German Search Report Corresponding to 10 2011 087 943.9 mailed Jun. 28, 2012.
(Continued)

*Primary Examiner* — Lindsay Low
*Assistant Examiner* — Charles Brauch
(74) *Attorney, Agent, or Firm* — Davis & Bujold, PLLC; Michael J. Bujold

(57) ABSTRACT

A control device for a hybrid vehicle having a drive-train with a hybrid drive unit including an internal combustion engine and an electric machine. A clutch is connected between the internal combustion engine and the electric machine. An automatic or automated transmission is connected between the hybrid drive unit and a drive output. When the hybrid vehicle has been driving and comes to a standstill with its internal combustion engine stopped, the control device automatically determines, on the one hand, a starting mode for the subsequent re-starting of the internal combustion engine when the hybrid vehicle is at rest, and the control device, on the other hand, automatically changes at
(Continued)

least the transmission and the clutch connected between the internal combustion engine and the electric machine of the hybrid drive unit to a condition appropriate for the starting mode determined by emitting appropriate control signals.

12 Claims, 1 Drawing Sheet

(51) Int. Cl.
*B60K 6/48* (2007.10)
*B60W 10/02* (2006.01)
*B60W 10/06* (2006.01)
*B60W 10/08* (2006.01)
*B60W 10/10* (2012.01)
*B60W 20/00* (2016.01)
*F02N 11/08* (2006.01)
*F02B 75/16* (2006.01)
*F02B 77/13* (2006.01)
*B60W 30/18* (2012.01)
*F02N 11/00* (2006.01)
*F02N 11/04* (2006.01)

(52) U.S. Cl.
CPC .............. *B60W 10/08* (2013.01); *B60W 10/10* (2013.01); *B60W 20/00* (2013.01); *B60W 30/181* (2013.01); *F02N 11/0818* (2013.01); *B60W 30/18027* (2013.01); *B60W 2510/0676* (2013.01); *B60W 2510/087* (2013.01); *B60W 2510/244* (2013.01); *B60W 2540/16* (2013.01); *B60W 2550/12* (2013.01); *F02B 63/044* (2013.01); *F02B 75/16* (2013.01); *F02B 77/13* (2013.01); *F02B 2063/045* (2013.01); *F02N 11/006* (2013.01); *F02N 11/04* (2013.01); *F02N 11/0862* (2013.01); *F02N 2200/023* (2013.01); *F02N 2200/045* (2013.01); *F02N 2200/0802* (2013.01); *F02N 2200/122* (2013.01); *F02N 2300/2002* (2013.01); *Y02T 10/48* (2013.01); *Y02T 10/6221* (2013.01); *Y02T 10/6286* (2013.01)

(58) Field of Classification Search
USPC .............................................................. 123/2
See application file for complete search history.

(56) References Cited

U.S. PATENT DOCUMENTS

| | | |
|---|---|---|
| 2007/0113814 A1 | 5/2007 | Tamai et al. |
| 2007/0163820 A1* | 7/2007 | Hoogenraad ................ 180/65.2 |
| 2007/0267231 A1 | 11/2007 | Ogata |
| 2009/0017988 A1* | 1/2009 | Reuschel ....................... 477/167 |
| 2009/0255743 A1* | 10/2009 | Dilzer et al. ............. 180/65.265 |
| 2010/0048353 A1 | 2/2010 | Iwase et al. |
| 2011/0136620 A1 | 6/2011 | Gibson et al. |

FOREIGN PATENT DOCUMENTS

| | | |
|---|---|---|
| EP | 2 063 088 A1 | 7/2007 |
| WO | 2011/117373 A1 | 9/2011 |

OTHER PUBLICATIONS

International Search Report Corresponding to PCT/EP2012/071784 mailed Feb. 11, 2013.
Written Opinion Corresponding to PCT/EP2012/071784 mailed Feb. 11, 2013.

* cited by examiner

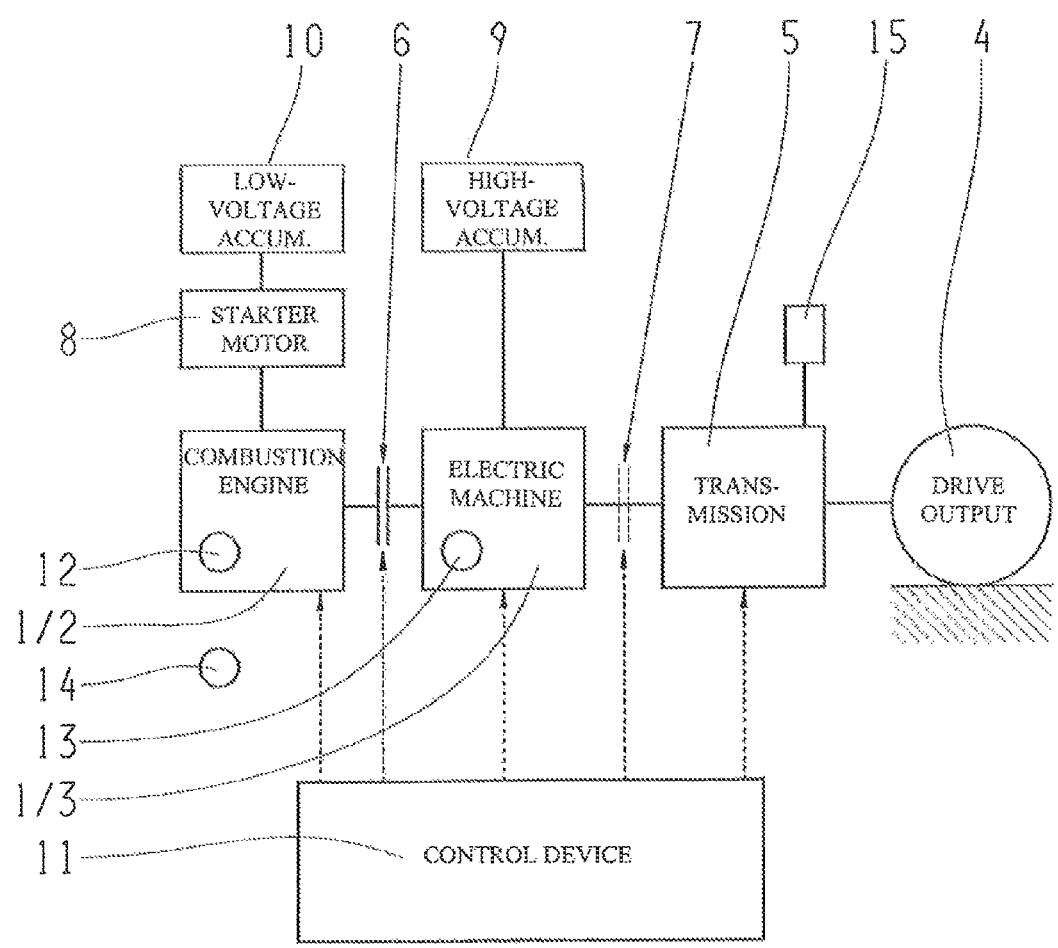

CONTROL DEVICE OF A HYBRID VEHICLE AND METHOD FOR OPERATING SAME

This application is a National Stage completion of PCT/EP2012/071784 filed Nov. 5, 2012, which claims priority from German patent application serial no. 10 2011 087 943.9 filed Dec. 8, 2011.

FIELD OF THE INVENTION

The invention concerns a control device of a hybrid vehicle. In addition, the invention concerns a method for operating a hybrid vehicle which has a hybrid drive unit comprising an internal combustion engine and an electric machine.

BACKGROUND OF THE INVENTION

A hybrid vehicle comprises a hybrid drive unit with an internal combustion engine and an electric machine. Connected between the hybrid drive unit of a hybrid vehicle and a drive output thereof is a transmission, namely an automatic or an automated transmission. Automatic transmissions are also called powershift transmissions.

When a hybrid vehicle that has been driving is brought to a standstill, it is already known from the prior art for a so-termed stop-start function of the internal combustion engine of the hybrid drive unit to stop the internal combustion engine when the motor vehicle is at rest and then to re-start the internal combustion engine, for example when the driver actuates the accelerator pedal. For example, this can happen when the motor vehicle stops at a traffic light or in a traffic jam.

In hybrid vehicles known from the prior art that have an automatic transmission, when the internal combustion engine is switched off or at rest the electric machine of the hybrid drive unit is coupled to the internal combustion engine and the transmission is shifted to neutral.

In hybrid vehicles known from the prior art that have an automated transmission, when the hybrid vehicle is at rest the internal combustion engine is decoupled from the electric machine of the hybrid drive unit and a starting gear is engaged in the transmission.

When the internal combustion engine is subsequently re-started, for example because the driver has actuated the accelerator pedal, the problem exists that the condition of the transmission and the condition of the clutch connected between the internal combustion engine and the electric machine of the hybrid drive unit may not be suitable for a starting mode of the motor vehicle that is to be used, so that before the internal combustion engine is actually started the transmission and the clutch connected between the internal combustion engine and the electric machine of the hybrid drive unit first have to be changed to a condition appropriate for the starting mode intended. This prolongs the time needed for starting the internal combustion engine, so the hybrid vehicle can then only move off after a time delay.

SUMMARY OF THE INVENTION

Starting from there, the purpose of the present invention is to provide a new type of control device and a new method for operating a hybrid vehicle. This objective is achieved by a control device described below. When the hybrid vehicle has been driving and is brought to a standstill with the internal combustion engine stopped, the control device automatically determines a starting mode for the subsequent re-starting of the internal combustion engine from when the hybrid vehicle is at rest. In addition, by emitting appropriate control signals the control device automatically changes at least the transmission and the clutch connected between the internal combustion engine and the electric machine of the hybrid drive unit, to a condition appropriate for the starting mode determined.

According to the present invention, it is proposed that when the hybrid vehicle has been driving and comes to a standstill with the internal combustion engine stopped, a control device of the hybrid vehicle automatically determines a starting mode for the subsequent re-starting of the internal combustion engine from when the hybrid vehicle is at rest, and in addition, by emitting appropriate control signals, the control device automatically shifts the transmission and the clutch connected between the internal combustion engine and the electric machine of the hybrid drive unit to a condition appropriate for the starting mode determined for starting the internal combustion engine.

This ensures that even before a demand to start the internal combustion engine, i.e. for example before the driver actuates the accelerator pedal, the transmission and the clutch connected between the internal combustion engine and the electric machine of the hybrid drive unit are in a condition appropriate for the starting mode determined, so that the internal combustion engine can subsequently always be started in a time-optimized manner. This avoids delays when starting the internal combustion engine. Preferably, the control device determines the starting mode for the subsequent re-start of the internal combustion engine immediately after the internal combustion engine has stopped. Furthermore, immediately after the internal combustion engine has stopped the control device changes at least the transmission and the clutch connected between the internal combustion engine and the electric machine to the condition appropriate for the starting mode determined, namely at the same time as or immediately after the starting mode for the internal combustion engine has been determined.

Preferably, the starting mode determined by the control device is either a starting mode that uses a starter motor, or a starting mode by means of the electric machine of the hybrid drive unit, and in a starting mode that uses the electric machine the control device determines either a direct start by the electric machine or an impulse start by the electric machine. The above starting modes of the internal combustion engine from when the hybrid vehicle is at rest are particularly preferred and, as a function of defined operating conditions of the motor vehicle, allow the internal combustion engine to be started in an optimum manner.

According to an advantageous further development, if the control device automatically determines the starting mode that uses the starter motor, it automatically opens the clutch connected between the internal combustion engine and the electric machine of the hybrid drive unit. Preferably, during this the control device also automatically engages a gear in the transmission. Alternatively, for safety reasons the transmission can also be shifted to neutral.

On the other hand, if the control device automatically determines a starting mode by means of the electric machine of the hybrid drive unit, then the control device automatically shifts the transmission to neutral and/or automatically opens a clutch connected between the electric machine and the transmission.

If the control device determines as the starting mode a direct start by means of the electric machine of the hybrid drive unit, then it automatically closes the clutch connected between the internal combustion engine and the electric machine of the hybrid drive unit. If the control device determines as the starting mode an impulse start by the electric machine of the hybrid drive unit, it first automatically opens the clutch connected between the internal combustion engine and the electric machine and then only automatically closes the clutch to start the internal combustion engine once the electric machine has accelerated to a rotational speed defined for the impulse start.

With the above details, depending on the starting mode chosen, a suitable condition of the transmission and of the clutch connected between the electric machine and the transmission can be ensured in order to be certain that the internal combustion engine is started in a time-optimized manner.

Preferably, the control device automatically determines the starting mode as a function of a temperature of the internal combustion engine and/or as a function of a temperature of the electric machine and/or as a function of a temperature of the surroundings and/or as a function of a state of charge of a high-voltage energy accumulator associated with the electric machine and/or as a function of a state of charge of a low-voltage energy accumulator associated with the starter motor and/or as a function of a position of a transmission selector lever. As a function of the above operating conditions of the drive-train, the starting mode for starting the internal combustion engine can be chosen automatically in a simple and reliable manner.

The method according to the invention for operating the hybrid vehicle is described below.

BRIEF DESCRIPTION OF THE DRAWINGS

Preferred further developments of the invention emerge from the description that follows. Example embodiments of the invention, to which it is not limited, are described in more detail with reference to the one drawing. The lone drawing shows an example showing the layout of a hybrid vehicle.

DETAILED DESCRIPTION OF THE PREFERRED EMBODIMENTS

The present invention concerns a control device for a hybrid vehicle and a method for operating the hybrid vehicle. Below, the invention is described with reference to the example drive-train shown in the FIGURE. The FIGURE shows an example of a drive-train of a hybrid vehicle, which comprises a hybrid drive unit 1 with an internal combustion engine 2 and an electric machine 3. Between the hybrid drive unit 1, namely its electric machine 3, and a drive output 4 is connected a transmission 5, the transmission 5 being an automatic transmission or an automated transmission. The FIGURE shows that between the internal combustion engine 2 and the electric machine 3 of the hybrid drive unit 1 there is connected a clutch 6, which is closed to couple the internal combustion engine 2 to the drive output 4 and opened to decouple the internal combustion engine 2 from the drive output 4. The FIGURE also shows that a further clutch 7 can optionally be provided, which can be connected between the electric machine 3 and the transmission 5.

Furthermore, The FIGURE shows a starter motor 8 with the help of which the internal combustion engine 2 of the hybrid drive unit can be started. The starter motor 8 draws its electrical energy from a low-voltage energy accumulator 10, the low-voltage energy accumulator 10 typically being a battery of the on-board electrical system of the hybrid vehicle. The electric machine 3 is associated with a high-voltage energy accumulator 9 in such manner that when the electric machine 3 is operating as a motor the high-voltage energy accumulator 9 is predominantly being discharged by the electric machine 3, whereas when the electric machine 3 is operating as a generator the accumulator can predominantly be charged by it.

In addition The FIGURE shows a control device 11, which can be a hybrid control device or a transmission control device. This control device 11 receives a number of input signals on the basis of which it generates a number of output signals in order to control and/or regulate the operation of components of the drive-train of the hybrid vehicle.

The input parameters of the control device 11 are, for example, a temperature of the internal combustion engine 2 which is detected by a temperature sensor 12 and can be transmitted to the control device 11. Other input parameters are a temperature of the electric machine 3 which is detected by a temperature sensor 13 and can be transmitted to the control device 11, and also a temperature of the surroundings which is detected by a temperature sensor 14 and can be transmitted to the control device 11. Still other input parameters for the control device 11 are for example a state of charge of the high-voltage energy accumulator 9, a state of charge of the low-voltage accumulator 10 and an actuation condition of a selector lever 15 of the transmission 5. Besides the above-mentioned input parameters, further input parameters can also be transmitted to the control device 11.

The present invention now concerns such details of the control device 11 and a method for operating a hybrid vehicle, by virtue of which, when the hybrid vehicle has been driving and is brought to a standstill with the internal combustion engine 2 stopped, the internal combustion engine 2 can be re-started in a time-optimized manner so that the hybrid vehicle can then be driven away without delay.

In the context of the invention, when the hybrid vehicle has been driving and then comes to rest with the internal combustion engine 2 stopped, the control device 11 automatically determines a starting mode for the subsequent re-starting of the internal combustion engine 2 while the hybrid vehicle is at rest.

For this, depending on operating parameters of the hybrid vehicle the control device 11 can automatically determine as the starting mode for the subsequent re-starting of the internal combustion engine, either a starting mode that uses the starter motor 8, or a starting mode by means of the electric machine 3 of the hybrid drive unit 1, wherein the starting mode that uses the electric machine 3 of the hybrid drive unit can be determined automatically by the control device 11 either as a so-termed direct start by the electric machine 3, or as a so-termed impulse start by the electric machine 3.

The control device 11 determines the starting mode for re-starting the internal combustion engine 2 as a function of operating parameters of the hybrid vehicle, for example as a function of a temperature of the internal combustion engine 2 detected by the temperature sensor 12, and/or as a function of a temperature of the electric machine 3 detected by the temperature sensor 13, and/or as a function of a temperature of the surroundings of the hybrid vehicle detected by the temperature sensor 14. Furthermore, the control device 11 can automatically determine the starting mode as a function of the state of charge of the high-voltage energy accumulator 9 associated with the electric machine 3 and/or as a function of the state of charge of the low-voltage energy accumulator associated with the starter motor 8. As a further operating parameter for the automatic determination of the starting mode by the control device 11, the position of the selector lever 15 of the transmission 5 can also be taken into account.

For example, if the state of charge of the high-voltage energy accumulator 9 associated with the electric machine 3 is too low for the internal combustion engine 2 to be started by the electric machine 3, then the control device 11 determines a starting mode by means of the starter motor 8. On the other hand, if the temperature of the internal combustion engine 2 is low enough to entail a high torque for starting it, which torque cannot be provided by the starter motor 8, then the control device 11 determines a starting mode by means of the electric machine 3 of the hybrid drive unit 1.

The control device 11 determines the starting mode for re-starting the internal combustion engine 2 immediately after the internal combustion engine 2 has been stopped.

In the context of the invention, when the hybrid vehicle has been driving and then comes to rest with the internal combustion engine 2 stopped, the control device 11 not only automatically determines the starting mode for the subsequent re-starting of the internal combustion engine 2 but, by emitting appropriate control signals, the control device 11 also automatically shifts the transmission 5 and changes the condition of the clutch 6 connected between the internal combustion engine 2 and the electric machine 3 of the hybrid drive unit 1 to a condition appropriate for the starting mode that has been determined. The control device 11 changes at least the transmission 5 and the clutch 6 connected between the internal combustion engine 2 and the electric machine 3 to the appropriate condition immediately after the internal combustion engine 2 has stopped, namely at the same time as or immediately after the determination of the starting mode for the internal combustion engine 2. In this way, for example when the driver then actuates an accelerator pedal of the hybrid vehicle and thereby calls for or initiates a re-start of the internal combustion engine 2, a time-optimized start of the internal combustion engine 2 is ensured since, already when an event that initiates the starting of the internal combustion engine 2 occurs or exists, the transmission 5 and the clutch 6 connected between the internal combustion engine 2 and the electric machine 3 of the hybrid vehicle are in, or adopt a condition appropriate for the starting mode determined.

Depending on operating parameters of the hybrid vehicle, if the control device 11 determines a starting mode that uses the starter motor 8, the control device 11 automatically opens the clutch connected between the internal combustion engine 2 and the electric machine 3 of the hybrid drive unit 1, namely by emitting an appropriate control signal for the clutch 6, such that the control device 11 transmits the control signal to actuators of the clutch 6 either directly, or indirectly by way of a further control device.

In this case, moreover, i.e. in the starting mode that uses the starter motor 8, the control device 11 preferably automatically engages a gear in the transmission 5 and/or the clutch 7 optionally connected between the electric machine 3 and the transmission 5, if present, is automatically closed by the control device 11, namely by emitting appropriate control signals for the transmission 5 and/or the optional clutch 7, which signals are transmitted by the control device 11 to actuators of the transmission 5 and/or the optional clutch 7, again either directly or indirectly by way of another control device.

Alternatively, in the starting mode that uses the starter motor 8, the transmission 5 can also be shifted to neutral for safety reasons.

In contrast, when the control device 11 determines a starting mode that uses the electric machine 3 of the hybrid drive unit 1 for the subsequent re-start of the internal combustion engine 2 while the hybrid vehicle is at rest, the control device 11 automatically shifts the transmission 5 to neutral and/or automatically opens the optional clutch 7, namely by transmitting appropriate control signals directly or indirectly to the actuators of those assemblies.

When the control device 11 has determined a direct start by the electric machine 3 of the hybrid drive unit 1 as the starting mode, for that purpose the control device 11 immediately closes the clutch 6 connected between the internal combustion engine 2 and the electric machine 3.

On the other hand if the starting mode determined is an impulse start by means of the electric machine 3, the control device 11 first automatically opens the clutch 6 connected between the internal combustion engine 2 and the electric machine 3, and the control device 11 then only closes the clutch 6 automatically to start the internal combustion engine 2 when the electric machine 3 has been accelerated to a rotational speed defined for the impulse start.

Accordingly, with the present invention it can be ensured that when a hybrid vehicle has been driving and then comes to a standstill and the internal combustion engine 2 of its hybrid drive unit 1 stops, on the one hand a starting mode is determined by the control device 11 for the subsequent re-starting of the internal combustion engine 2, and on the other hand the control device 11 automatically changes components of the drive-train of the hybrid vehicle, namely the transmission 5 and the clutch 6 connected between the internal combustion engine 2 and the electric machine 3, to a condition appropriate for the starting mode chosen, so that already before the occurrence of the event that initiates the re-starting of the internal combustion engine 2, for example before the driver actuates an accelerator pedal, the drive-train is in the condition appropriate for the starting mode chosen. In such a case the internal combustion engine 2 can be started more rapidly and the hybrid vehicle can move off from rest without delay. This increases the driver's acceptance of a stop-start function by improving the dynamics of starting the internal combustion engine.

If the hybrid vehicle is to be started from rest purely electrically and no starting of the internal combustion engine 2 is desired, then the transmission 5 and the clutch 6 are changed to a condition that corresponds to the condition appropriate for the starting mode that uses the starter motor.

INDEXES

1 Drive aggregate hybrid drive unit
2 Internal combustion engine
3 Electric machine
4 Drive output
5 Transmission
6 Clutch
7 Clutch
8 Starter motor
9 High-voltage energy accumulator
10 Low-voltage energy accumulator
11 Control device
12 Temperature sensor
13 Temperature sensor
14 Temperature sensor
15 Selector lever

The invention claimed is:

1. A control device (11) for a hybrid vehicle which has a drive-train with a hybrid drive unit (1) comprising an internal combustion engine (2) and an electric machine (3), and a first clutch (6) that is connected between the internal combustion engine (2) and the electric machine (3),
either an automatic or an automated transmission (5) that is connected between the hybrid drive unit (1) and a drive output (4),
the control device communicates with the transmission and the first clutch, and at least one of an engine temperature sensor, an electric machine temperature sensor, and a further temperature sensor, the transmission and the first clutch being controllable by control signals emitted by the control device such that when the hybrid vehicle becomes stationary after driving and immediately after the internal combustion engine (2) stops running, the control device (11) automatically determines an engine starting mode for subsequent re-starting of the internal combustion engine (2),
the engine starting mode is a direct start by the electric machine, an impulse start by the electric machine or a start by a starter motor, and is determined as a function of at least one of a temperature of the electric machine (3), and a state of charge of an energy accumulator (10) that communicates with the starter motor (8), and the control device emits appropriate control signals to at least the transmission and the first clutch for re-starting the internal combustion engine based on the determined engine starting mode, and immediately after the internal combustion engine (2) stops running, the control device (11) automatically changing at least the transmission (5) and the first clutch (6) to a condition appropriate for the determined engine starting mode, and the internal combustion engine is re-started according to the determined engine starting mode,
either at a same time as or immediately after determining the engine starting mode for the internal combustion engine (2), the control device automatically changes at least the transmission (5) and the first clutch (6), that is connected between the internal combustion engine (2) and the electric machine (3), to the condition appropriate for the determined engine starting mode, so that the transmission (5) and the first clutch (6) are already in the condition appropriate for the determined engine starting mode, prior to an event that initiates the subsequent re-starting of the internal combustion engine,
the clutch and the transmission are immediately set in the condition appropriate for the determined engine starting mode, after the internal combustion engine stops running and prior to the event that initiates the subsequent re-starting of the internal combustion engine, such that the clutch is controlled to be either completely disengaged or completely engaged depending on the determined engine-starting mode.

2. The control device according to claim 1, wherein a selector lever of the transmission communicates with the control device and the control device automatically determines the engine starting mode as a function of a position of the selector lever (15) of the transmission (5), and
recognizing accelerator pedal actuation as the event that initiates the subsequent re-starting of the internal combustion engine according to the determined engine starting mode.

3. The control device according to claim 1, wherein when the control device determines the engine starting mode that uses the starter motor (8), the control device automatically completely disengages the first clutch (6) that is connected between the internal combustion engine (2) and the electric machine (3) of the hybrid drive unit.

4. The control device according to claim 3, wherein the control device also at least one of automatically engages a gear in the transmission (5) and engages a second clutch (7) that is connected between the electric machine (3) and the transmission (5).

5. The control device according to claim 3, wherein the control device also automatically shifts the transmission (5) to neutral.

6. The control device according to claim 1, wherein when the control device automatically determines the engine starting mode that uses the electric machine (3) to start the internal combustion engine, the control device at least one of automatically shifts the transmission (5) to neutral and automatically disengages a second clutch (7) that is connected between the electric machine (3) and the transmission (5).

7. The control device according to claim 6, wherein when the control device determines, as the engine starting mode, the direct start via the electric machine, the control device automatically completely engages the first clutch (6) that is connected between the internal combustion engine (2) and the electric machine (3) of the hybrid drive unit.

8. The control device according to claim 6, wherein when the control device determines, as the engine starting mode, the impulse start via the electric machine, the control unit first automatically completely disengages the first clutch (6) connected between the internal combustion engine (2) and the electric machine (3), and then, to start the internal combustion engine, the control device only automatically engages the first clutch again once the electric machine accelerates to a defined rotation speed.

9. A method of operating a hybrid vehicle having a hybrid drive unit that comprises an internal combustion engine and an electric machine, a clutch connected between the internal combustion engine and the electric machine and either an automatic or an automated transmission, and a control device that communicates with the transmission, the clutch and at least one of an engine temperature sensor, an electric machine temperature sensor and a further temperature sensor, the method comprising the steps of:
stopping driving of the hybrid vehicle and terminating running of the internal combustion engine,
when the hybrid vehicle becomes stationary and the internal combustion engine stops running, automatically determining, with the control device, an engine starting mode for a subsequent re-starting of the internal combustion engine, the determined engine starting mode is either a direct start by the electric machine, an impulse start by the electric machine or a start by a starter motor, based on a temperature of the electric machine, and a state of charge of an energy accumulator that communicates with the starter motor,
automatically changing, with the control device, at least the transmission and the clutch, connected between the internal combustion engine and the electric machine, to a condition appropriate for the determined engine starting mode, and the transmission and the clutch being automatically changed to the condition appropriate for the determined engine starting mode either at a same time as or immediately after automatically determining the engine starting mode for the internal combustion engine and prior to an event that initiates the re-starting of the internal combustion engine, and the clutch being changed so as to be either completely disengaged or completely engaged depending on the determined engine starting mode, recognizing the event that initiates the re-starting of the internal combustion engine, subsequent to the automatic changing of at least the transmission and the clutch to the condition appropriate for the determined engine starting mode, and initiating the re-starting of the internal combustion engine according to determined engine starting mode.

10. A method of operating a hybrid vehicle having a hybrid drive unit which has a drive-train including a hybrid drive unit (1) with an internal combustion engine (2) and an electric machine (3), a first clutch (6) is connected between the internal combustion engine (2) and the electric machine (3) and either an automatic or an automated transmission (5) is connected between the hybrid drive unit (1) and a drive output (4), and a control device that communicates with the transmission, the first clutch and at least one of an engine temperature sensor, an electric temperature sensor and a further temperature sensor, the method comprising the steps of:

terminating running of the internal combustion engine and bringing the hybrid vehicle to a stop;

automatically selecting, with the control device (11), an engine starting mode from engine starting modes consisting of a direct start by the electric machine, an impulse start by the electric machine and a start by a starter motor when the hybrid vehicle becomes stationary and immediately after the internal combustion engine (2) stops running, and the determined engine starting mode being used for subsequent re-starting of the internal combustion engine (2);

selecting the engine starting mode based on at least one of a temperature of the electric machine and a state of charge of an energy accumulator that communicates with the starter motor;

automatically adjusting, with the control device, at least the transmission (5) and the first clutch (6) operating conditions that are appropriate for implementing the determined engine starting mode by emitting, via the control device (11), appropriate control signals to at least the transmission (5) and the first clutch (6), at least the transmission and the first clutch operating conditions being automatically adjusted before the subsequent re-starting of the internal combustion engine is initiated, such that the first clutch is either fully disengaged or fully engaged depending on the determined engine starting mode; and initiating the subsequent re-starting of the internal combustion engine, according to the determined engine starting mode, following the automatic adjustment of at least the transmission and the first clutch operating conditions.

11. The method according to claim 10, further comprising the steps of either automatically shifting the transmission to neutral or automatically disengaging a second clutch that is located between the transmission and the drive output with the control device, if the determined engine starting mode is either the direct start by the electric machine or the impulse start by the electric machine.

12. The method according to claim 10, further comprising the steps of automatically disengaging the first clutch and engaging a gear in the transmission with the control device, if the determined engine starting mode is the start by the starter motor, and recognizing accelerator pedal actuation as a demand for initiating the subsequent re-starting of the internal combustion engine according to the determined engine starting mode.

* * * * *